United States Patent [19]
Moore, Jr.

[11] Patent Number: 4,959,906
[45] Date of Patent: Oct. 2, 1990

[54] SAFETY DEVICE FOR CHAIN SAWS

[76] Inventor: Marvin J. Moore, Jr., 328 Meyer Ave., Dayton, Ohio 45431

[21] Appl. No.: 399,616

[22] Filed: Aug. 28, 1989

[51] Int. Cl.⁵ .............................................. B23D 57/02
[52] U.S. Cl. .................................... 30/381; 123/198 D
[58] Field of Search .................. 30/382, 383, 384, 387, 30/381; 123/198 D

[56] References Cited
U.S. PATENT DOCUMENTS

| | | |
|---|---|---|
| 3,361,165 | 1/1968 | Irgens . |
| 3,844,360 | 10/1974 | Green . |
| 4,028,804 | 6/1977 | Hammond . |
| 4,753,012 | 6/1988 | Schurr ..................................... 30/382 |

*Primary Examiner*—Frank T. Yost
*Assistant Examiner*—Willmon Fridie, Jr.

[57] ABSTRACT

A safety device for use on chain saws to prevent one-handed operation of the saw. A swingable bar structure is carried on the saw housing to connect with an engine carburetor throttle arm. Before the engine can develop sufficient power to move the cutter chain the user must manually draw the bar structure to a specific position alongside a hand grip structure on the saw housing. One of the user's hands will engage the safety device bar structure; the other hand will operate a trigger mechanism. Both hands must be used before the cutter chain can begin to move.

7 Claims, 1 Drawing Sheet

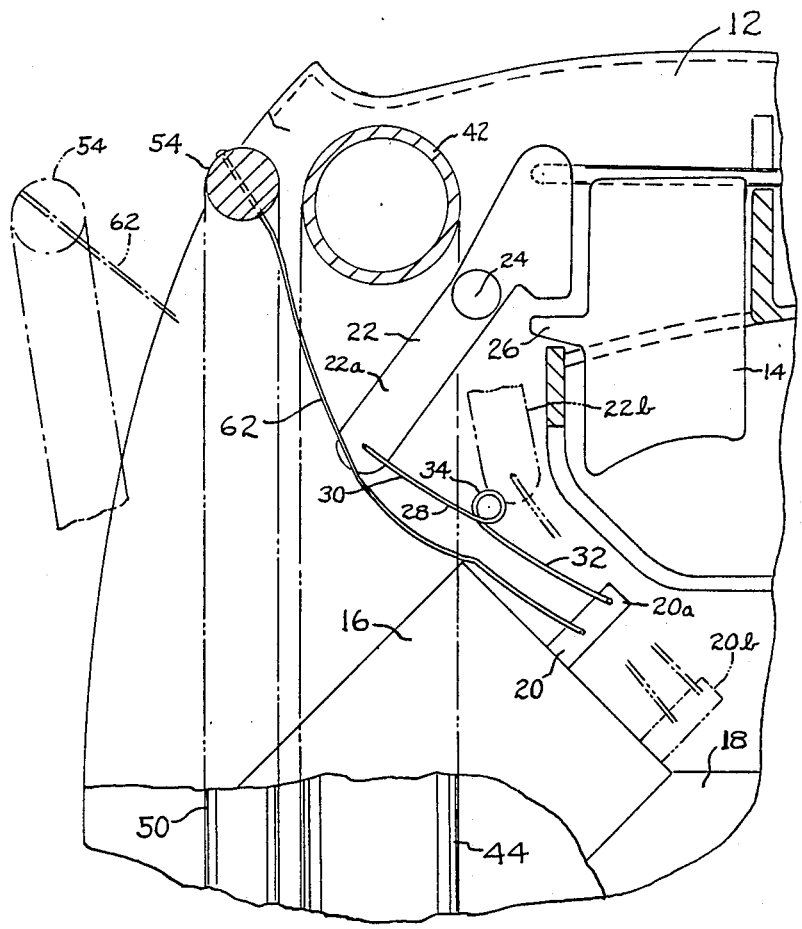
FIG. 1
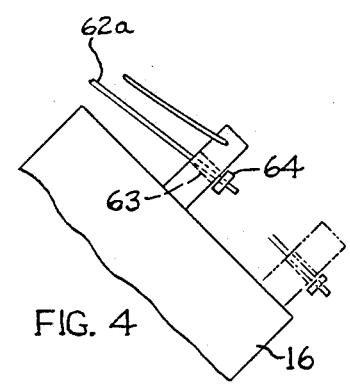
FIG. 4
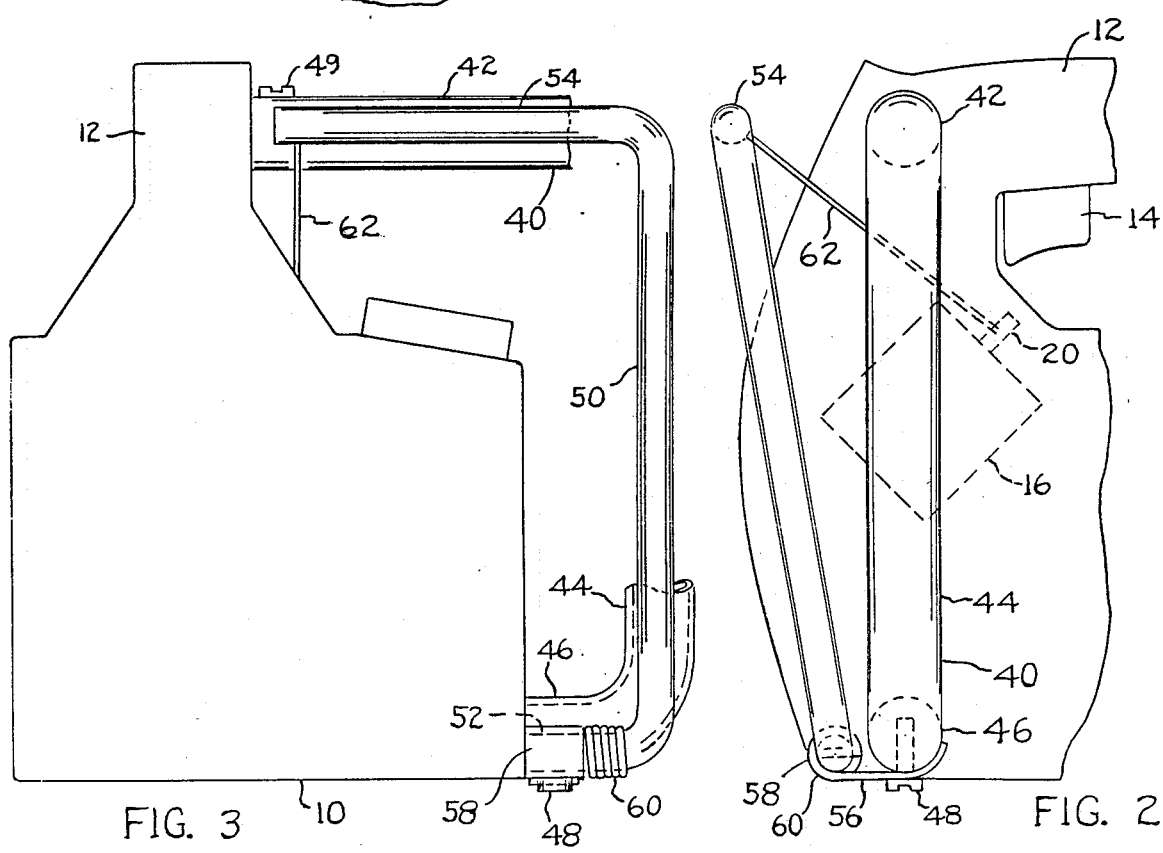
FIG. 3
FIG. 2

SAFETY DEVICE FOR CHAIN SAWS

BACKGROUND AND SUMMARY OF THE INVENTION

This invention relates to chain saws, and especially to a safety device for preventing the cutter chain from moving when the user grips the saw mechanism with only one hand.

Conventional chain saws have a trigger mechanism built into a longitudinally extending hand grip device located above the engine housing The trigger mechanism is linked to a carburetor throttle operator arm, such that a manual squeeze force on the trigger mechanism can cause the engine to develop full power, for thereby moving the cutter chain at relatively high cutting speeds. It is thus possible for the outdoorsman to operate a chain saw with only one hand.

However, one handed operation of a chain saw can be dangerous to the user. He may not have firm control of the saw, and he runs the risk of cutting himself with the moving cutter chain. For example, he may hold a tree branch with one hand while attempting to manipulate the chain saw with his other hand, running the risk of cutting his hand or arm along with the tree branch.

One handed operation of a chain saw may also be dangerous at start-up. Often the outdoorsman will hold the saw mechanism in one hand while pulling the starter cord with his other hand. The reaction forces can cause the cutter chain to swing downward so as to cut into the user's foot or leg.

The present invention contemplates a safety device that is attachable to a conventional chain saw to require the user to have two hands on the saw mechanism before it is possible for the cutter chain to move. The safety device is preferably constructed as an attachment for existing chain saws.

THE DRAWINGS

FIG. 1 is a fragmentary sectional view through a chain saw having an embodiment of the invention incorporated therein.

FIG. 2 is a fragmentary side elevational view of the chain saw shown in FIG. 1.

FIG. 3 is a front elevational view of the FIG. 2 chain saw.

FIG. 4 is a fragmentary view of a structural detail that is usable as an alternative to certain details used in the FIG. 1 chain saw.

DESCRIPTION OF A PREFERRED EMBODIMENT OF THE INVENTION

FIGS. 1 through 3 illustrate a chain saw constructed as shown in greater detail in R. Green et al U.S. Pat. No. 3,844,360. My invention concerns a safety device that can be attached to the already patented chain saw (or various other saws on the market).

The illustrated chain saw includes a chain saw housing 10 having a longitudinally extending handle structure 12 that contains a manual trigger 14. A carburetor 16 is located within housing 10 below trigger 14. The engine 18 burns the fuel supplied by the carburetor, to thereby power a non-illustrated cutter chain. Engine power is controlled by a throttle operator arm 20 that moves between an engine-idle setting 20a and a full power setting 20b.

Throttle operator arm 20 is connected to trigger 14 by a linkage that includes a lever 22 having a pivot axis 24. A link 28 extends from lever 22 to throttle operator arm 20. Upward manual motion of trigger 14 causes lug 26 to swing lever 22 from the full line position 22a to dashed line position 22b. Link 28 shifts throttle arm 20 from idle setting 20a to full power setting 20b.

Link 28 is formed of a length of spring wire that includes two essentially straight end sections 30 and 32, and an intermediate loop section 34. Link 28 is a resilient compressible structure that can fold on itself in the event that throttle operator arm 20 is restrained against movement from idle setting 20a. The fold-up action involves an upward displacement of loop section 34 and upward deflections of wire sections 30 and 32 into an inverted V-configuration. Normally wire link 28 will assume the configuration illustrated in FIG. 1.

The chain saw is designed for two-handed operation. One of the user's hand is placed around handle 12, with the user's first finger engaged with trigger 14. The user's other hand is placed on a transverse tubular handle 40. Handle 40 includes an upper horizontal hand grip section 42, a vertical section 44, and a relatively short inturned lower section 46. A screw 48 is extended through handle section 46 into a cylindrical lug extending from housing 10; another screw 49 is extended into handle section 42 and an associated cylindrical lug. Handle 40 is thereby rigidly fastened to housing 10.

The user can bypass handle 40, i.e. he can operate the saw with one hand by holding handle 12 and depressing trigger 14 with the same hand. The present invention concerns a safety device that will require the user to grip both handles (12 and 40) in order to achieve sufficient power to drive the cutter chain.

The new safety device comprises a bar structure 50 swingably connected to housing 10. As seen in FIG. 3, bar structure 50 has a C-shaped configuration, that includes a lower relatively short leg 52 and an upper relatively long leg 54. Leg 54 extends parallel to hand grip portion 42 of handle 40, such that the user of the chain saw can simultaneously grip bar section 54 and hand grip portion 42.

Bar structure 50 is swingably attached to housing 10 by means of a bracket 56. As seen in FIG. 2, the bracket extends underneath section 46 of handle 40; screw 48 extends through the bracket for mounting purposes. The bracket includes a circular (cylindrical) sleeve section 58 that receives leg 52 of bar structure 50. Structure 50 is formed out of circular cross sectioned rod stock; therefore, leg 52 has a swivel (swingable) fit in sleeve 58. Bar structure 50 can swing around the sleeve 58 axis.

A torsion coil spring 60 encircles leg 52 to bias bar structure 50 from the FIG. 1 position to the FIG. 2 position. The biasing effect of spring 60 is limited by the fact that bar section 54 is connected to throttle operator arm 20 via a wire-like flexible connector 62 (FIG. 2). When bar section 54 is allowed to move away from hand grip section 42 by the biasing action of spring 60 the flexible connector 62 will assume a taut condition; the throttle operator arm 20 will then be restrained in its engine-idle setting.

FIG. 1 shows bar structure 50 pulled toward hand grip section 42. Flexible connector 62 will relax and droop slightly, therefore offering essentially no resistance to movement of arm 20 from the idle setting 20a to full power setting 20b. Such movement of arm 20 is accomplished by a manual squeeze action on trigger 14; lever 22 moves toward the dashed line position so that link 28 is able to exert the necessary push force on arm 20.

When bar structure 50 is in the FIG. 1 position link 28 acts as a rigid link between lever 22 and arm 20. However, when the bar structure is moved away from hand grip section 42 (dashed lines in FIG. 1) flexible connector 62 exerts a pulling force on arm 20. This restraining force acts as a resistance to link 28 motion. The link therefore, folds up without producing movement of arm 20 toward the full power position. In order for the system to work the biasing effect of spring 60 must be greater than the spring force of link 28 (i.e. the force within the wire tending to keep wire sections 30 and 32 in alignment).

When arm 20 is in the engine idle setting 20a the engine will be running; however, not enough power will be developed to move the cutter chain. Before the cutter chain can start to move bar operator section 54 must be drawn toward hand grip section 42. This normally requires that the outdoorsman use both hands to grip the saw mechanism (one hand on handle 12 and the other hand around sections 42 and 54). The structural arrangement promotes safe two-handed operation of the chain saw.

FIG. 4 fragmentarily shows a slight variant of the invention wherein a flexible wire connector 62a has a slidable fit in an opening 63 in operator arm 20; an enlargement 64 on connector 62a enables the connector to exert a pulling action on arm 20 when the associated bar structure is spring-biased away from hand grip section 42. When bar section 54 is moved toward hand grip section 42 enlargement of 64 is moved to the dashed line position, thereby enabling the spring link 28 to operate arm 20 between the idle and full power settings.

The wire-like connector 62 or 62a should be flexible so that it does not exert any significant force on arm 20 when section 54 of the bar structure is in its FIG. 1 position (full lines). Connector 62 or 62a can be formed of various materials, e.g. steel cable or cord material.

The safety device can be constructed as an add-on device for use with existing chain saws.

I claim:

1. In a chain saw that comprises a housing, a handle secured to said housing, said handle having a generally horizontal hand grip section extending above the housing; a carburetor located within said housing, said carburetor having a throttle operator arm movable through a predetermined stroke between an idle setting and a full power setting; a manual trigger mechanism carried on the housing; and link means between the trigger mechanism and the throttle operator arm; the improvement comprising a safety device mounted on the chain saw housing for preventing movement of the throttle arm from its idle setting; said safety device including a bar structure swingably mounted on the chain saw, said bar structure comprising a bar operator section extending along the aforementioned hand grip section so that when the user places his fingers around the hand grip section the fingers will contact the bar operator section to enable the user to pull said bar operator section toward the hand grip section; spring means acting on the bar structure to move said bar operator section away from the hand grip section; and a flexible wire-like connector between said bar operator section and said throttle arm; said flexible connector assuming a taut condition when said bar operator section is spring-biased away from the hand grip section, whereby the throttle arm is then retained in its idle setting even though the trigger mechanism is moved to a position calling for full engine power.

2. The improvement of claim 1 wherein the link means between the trigger mechanism and the throttle operator arm comprises a resilient compressible link element that can deflect when the bar operator section is spring-biased away from the hand grip section and a manual force is applied to the trigger mechanism.

3. The improvement of claim 2 wherein said compressible link comprises a wire spring having two relatively straight end sections and an intermediate loop section.

4. The improvement of claim 2 wherein said spring means exerts a stronger spring force than the resilient compressible link, whereby the link force is insufficient to move the bar structure when said bar structure is spring-biased away from the handle.

5. The improvement of claim 2 wherein said bar structure is a C-shaped structure having a lower relatively short leg swingably mounted on an undersurface of the chain saw housing and an upper relatively long leg extending parallel to the hand grip section.

6. The improvement of claim 5, and further comprising a bracket attached to said handle remote from the hand grip section, said bracket including a circular sleeve; said lower leg of the bar structure extending into said circular sleeve to swingably mount the bar structure.

7. The improvement of claim 6 wherein said spring means comprises a torsion coil spring encircling the lower leg of the bar structure.

* * * * *